United States Patent
Oh et al.

[19]

[11] Patent Number: 5,969,778
[45] Date of Patent: Oct. 19, 1999

[54] ACTIVE MATRIX LIQUID CRYSTAL DISPLAY HAVING A CONTACT HOLE

[75] Inventors: Young-Jin Oh; Kyoung-nam Lim, both of Seoul, Rep. of Korea

[73] Assignee: LG Electronics Inc., Seoul, Rep. of Korea

[21] Appl. No.: 08/843,507

[22] Filed: Apr. 16, 1997

[30] Foreign Application Priority Data

Aug. 30, 1996 [KR] Rep. of Korea ...................... 96-36719

[51] Int. Cl.⁶ .................................................. G02F 1/136
[52] U.S. Cl. ................................................. 349/43; 257/59
[58] Field of Search .................................. 349/43; 257/59

[56] References Cited

U.S. PATENT DOCUMENTS

| | | | |
|---|---|---|---|
| 4,938,567 | 7/1990 | Chartier | 350/333 |
| 5,003,356 | 3/1991 | Wakai et al. | 357/4 |
| 5,055,899 | 10/1991 | Wakai et al. | 357/23.7 |
| 5,058,995 | 10/1991 | Plus | 359/59 |
| 5,414,283 | 5/1995 | den Boer et al. | 257/59 |
| 5,441,905 | 8/1995 | Wu | 437/41 |

FOREIGN PATENT DOCUMENTS 0 288 011  10/1988  European Pat. Off. .
0 672 944 A1  9/1995  European Pat. Off. .

OTHER PUBLICATIONS

Patent Abstracts of Japan, Kokai No. 7–66419, Mar. 10, 1995.
Patent Abstracts of Japan, Kokai No. 60–192369, Sep. 30, 1985.
Howard, "Active–Matrix Techniques for Displays," 2320 Proceedings of the Society for Information Display (SID), vol. 27, No. 4, 1986, pp. 313–326.

*Primary Examiner*—William L. Sikes
*Assistant Examiner*—Robert J. Hollingshead
*Attorney, Agent, or Firm*—Finnegan, Henerson, Farabow, Garrett & Dunner, L.L.P.

[57] ABSTRACT

An active matrix liquid crystal display (AMLCD) with a high aperture ratio and with an etch stopper formed by a back exposure method, and not with an additional pattern mask. The AMLCD has a gate line that extends in a first direction on the substrate and has a first region that corresponds to the gate electrode region. The gate line also has a second region corresponding to a non-gate electrode region and a contact hole adjacent to the first region and the second region. A thin film transistor (TFT) of the AMLCD is formed with a nonlinear channel region.

15 Claims, 6 Drawing Sheets

ACTIVE MATRIX LIQUID CRYSTAL DISPLAY HAVING A CONTACT HOLE

BACKGROUND OF THE INVENTION

The present invention relates to an active matrix liquid crystal display (AMLCD), in which no pattern mask is required to form an etch stopper.

A conventional AMLCD includes a large number of pixels and associated switching devices, such as thin film transistors (TFTs), arranged in an array. The pixels are interconnected by a plurality of gate lines, data bus lines, and pads formed at each end of the gate and data bus lines. Each pixel includes a pixel electrode, which is electrically connected to the switching devices for applying voltages depending on whether light is to be transmitted or blocked by the pixel. A storage capacitor is also included to improve the pixel's electrical characteristics.

FIG. 1A is a plan view showing a first example of a conventional AMLCD having an etch stopper formed by a back exposure method, and FIG. 1B is a cross-sectional view along the line I—I of FIG. 1A.

As shown in FIG. 1, each pixel includes: (1) a gate line 1 and data line 2, which cross each other; (2) a gate electrode 11 extending from gate line 1; (3) a semiconductor active layer 14 overlapping gate electrode 11; (4) a source electrode 16 extending from data line 2; and (5) a TFT 3 including a drain electrode 17 formed corresponding to source electrode 16. Further, a pixel electrode 19 is connected to drain electrode 17. Finally, an etch stopper, not shown in FIG. 1A, is formed having the same shape as gate line 1.

As shown in FIG. 1B, a protruding portion of the gate line serves as the gate electrode 11 of the TFT. Gate electrode 11 is formed on an insulating substrate 10, and a first insulating layer 13 is formed on an exposed surface of insulating substrate 10. Moreover, gate electrode 11 and semiconductor active layer 14 are formed overlapping the gate electrode 11.

Further, an etch stopper is formed on semiconductor active layer 14 by a back exposure method. In this instance, the method of fabricating the etch stopper includes the steps of: forming successively an insulating layer and positive photoresist film on semiconductor active layer 14 and the exposed first insulating layer; patterning the photoresist film by a back exposure process; developing the photoresist film to form a photoresist pattern; etching the insulating layer to form an etch stopper; removing the photoresist pattern.

Next, an ohmic contact layer 6 is formed on portions of etch stopper 15 and semiconductor active layer 14. Ohmic contact layer 6 does not constitute part of the channel. A source electrode 16 is then formed on semiconductor active layer 14, partially overlapping gate electrode 11. In addition, a drain electrode 17 is formed partially overlapping gate electrode 11 and symmetrically with source electrode 16. Then, a second insulating layer 18 is formed on source/drain electrodes 16 and 17 to protect insulating substrate 10. Pixel electrode 19 is then formed connected to drain electrode 17 through a contact hole formed in the second insulating layer 18. Gate electrode 11 may be formed of a conductive material capable of anode-oxidation. This material choice allows an oxide insulating layer 12 to be formed on a surface of gate electrode 11.

As described above, in a conventional AMLCD, the etch stopper is formed easily without preparing a pattern mask. This AMLCD does not improve the aperture ratio, however, because the gate electrode protrudes beyond the gate line.

FIG. 2A is a plan view showing a second example of the conventional AMLCD. The etch stopper in this example was formed using a pattern mask. FIG. 2B is a cross-sectional view taken along the line II—II of FIG. 2A.

As shown in FIG. 2A, a mostly linear gate line 22 is provided on an insulating substrate, and a data line 21 is provided crossing gate line 22. Data line 21 has a protruding portion 23 extending in the same direction as gate line 22. A drain electrode 24 is formed in corresponding relationship to a source electrode, which includes protruding portion 23 at one side of data line 21 and an inner portion lateral of data line 21. Drain electrode 24 is connected to an upper portion of pixel electrode 29. Here, drain electrode 24 overlaps part of gate line 22 and is formed at an equally spaced distance from the source electrode. The protruding portion of adjacent data line 21, drain electrode 24, and semiconductor island-shaped active layer 27 are formed such that the angle between the drain electrode and a channel region of the TFT is non-linear or L-shaped. As a result, current flows from the entire source electrode. Further, since the channel length can be increased, it is possible to reduce the physical size of the source electrode while maintaining the same level of current flow as in the general conventional TFT. A reduction in the source electrode's physical size lessens the amount of source-gate electrode overlap and thus the resulting capacitance $C_{gs}$ can also be reduced. Moreover, since the structure of gate line 22 is almost linear, the aperture ratio is increased.

As shown in FIG. 2B, a gate electrode of mostly linear gate line 22 is formed on an insulating substrate 20, and a first insulating layer 26-1 is formed on an exposed surface of insulating substrate 10 and gate electrode 22. Also, first insulating layer 26-1 and semiconductor active layer 27 are formed to overlap the gate electrode 22.

In this device, a pattern mask is used to form an etch stopper 28 on semiconductor active layer 27. The method of fabricating the etch stopper includes the steps of forming successively an insulating layer and positive photosensitive photoresist film on semiconductor active layer 27 and the exposed first insulating layer 26-1, exposing the photoresist film using a pattern mask, developing the photoresist film to form photoresist pattern, and etching the insulating layer to form the etch stopper.

Next, ohmic contact layer 25 is formed on portions of etch stopper 28 and semiconductor active layer 27. Then, a source electrode 23 is formed on semiconductor active layer 28 partially overlapping gate electrode 22. In addition, a drain electrode 24 is formed partially overlapping gate electrode 22. Next, a second insulating layer 26-2 is formed on source/drain electrodes 23 and 24. A pixel electrode 29 is formed and connected to drain electrode 24 through a contact hole in the second insulating layer 26-2. In this instance, gate electrode 22 may be formed of a conductive material capable of anode-oxidation. This material choice allows an oxide insulating layer 22-1 to be formed on a surface of gate electrode 22.

While this second AMLCD example also has an improved aperture ratio due to the gate line's almost linear structure, it requires using a pattern mask to form the etch stopper. This requirement adds complexity and additional cost to the AMLCD fabrication process. For this reason, a need exists for an AMLCD fabrication method which permits forming an etch stopper without the additional complexity of first forming a pattern mask on the substrate layer.

SUMMARY OF THE INVENTION

Accordingly, it is a goal of the present invention to provide an AMLCD in which an etch stopper is formed without first preparing a pattern mask, and in which the aperture ratio is increased.

Additional advantages of the invention will be set forth in part in the description which follows, and in part will be obvious from the description, or may be learned by practice of the invention. The advantages of the invention may be realized and obtained by the elements and combinations particularly pointed out in the appended claims and the drawings.

To achieve these and other advantages and in accordance with this invention, as embodied and described herein, there is provided an active matrix liquid crystal display (AMLCD) including: an insulating substrate; a gate line extending in a first direction on the substrate and having a first region corresponding to gate electrode region, a second region corresponding to a non-gate electrode region, and a contact hole adjacent to the first region and the second region, the gate line exposing a portion of the substrate; a first insulating layer formed on the gate line; an island-shaped semiconductor active layer formed above and overlapping the first region and a portion of the contact hole of the gate line; an etch stopper formed on semiconductor active layer and exposing a portion of the semiconductor active layer; a data line formed on the substrate crossing the gate line and having a first portion, a protruding portion, extending in the first direction above the first region of the gate line and connecting the exposed portion of the semiconductor active layer as a source electrode, and a second portion contiguous with the protruding portion, the first and second portions of the data line overlying the gate line; and a drain electrode formed corresponding with the source electrode.

In another aspect, there is provided a method of fabricating an AMLCD including the steps of: providing a first conductive layer on a substrate surface; patterning the first conductive layer to form a gate line extending in a first direction on the substrate surface and having a first region corresponding to gate electrode region, a second region corresponding to a non gate electrode region, and a contact hole adjacent to the first region and the second region, the gate line exposing a portion of the substrate; forming an insulating layer on the first conductive layer and the exposed portion of the surface of the substrate; forming an amorphous silicon layer on the insulating layer; patterning the amorphous silicon layer to form a semiconductor active layer overlapping the first region and a portion of the contact hole of the gate line, and exposing a portion of the first insulating layer; forming an insulating layer on an exposed surface of the first insulating layer and on the semiconductor active layer; patterning the insulating layer to form an etch stopper having the same shape as the gate line, exposing a portion of the semiconductor active layer; forming a second conductive layer on the substrate; and, patterning the second conductive layer to form a data line on the substrate.

According to a still further aspect of the invention, there is provided an active matrix liquid crystal display (AMLCD) including: an insulating substrate; a gate line extending in a first direction on the substrate and having a first region corresponding to gate electrode region, a second region corresponding to a non-gate electrode region, and a contact hole adjacent to the first region and the second region, the gate line exposing a portion of the substrate; a first insulating layer formed on the gate line; an island-shaped semiconductor active layer formed above and overlapping the first region and a portion of the contact hole of the gate line; a data line formed on the substrate crossing the gate line and having a first portion, a protruding portion, extending in the first direction above the first region of the gate line and connecting the exposed portion of the semiconductor active layer as a source electrode of a TFT, and a second portion contiguous with the protruding portion, the first and second portions of the data line overlying the gate line; and a drain electrode formed corresponding with the source electrode, the contact hole of the gate line providing that the R/C-type delay of the gate line and the turn-on time of the TFT are reduced.

Both the general description and the following detailed description are exemplary and explanatory only and do not restrict the invention as claimed.

BRIEF DESCRIPTION OF THE DRAWINGS

The accompanying drawings, which are incorporated in and constitute a part of the specification, illustrate a presently preferred embodiment of the invention and together with the description, serve to explain the principles of the invention.

In the drawings.

DETAILED DESCRIPTION OF THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1A:
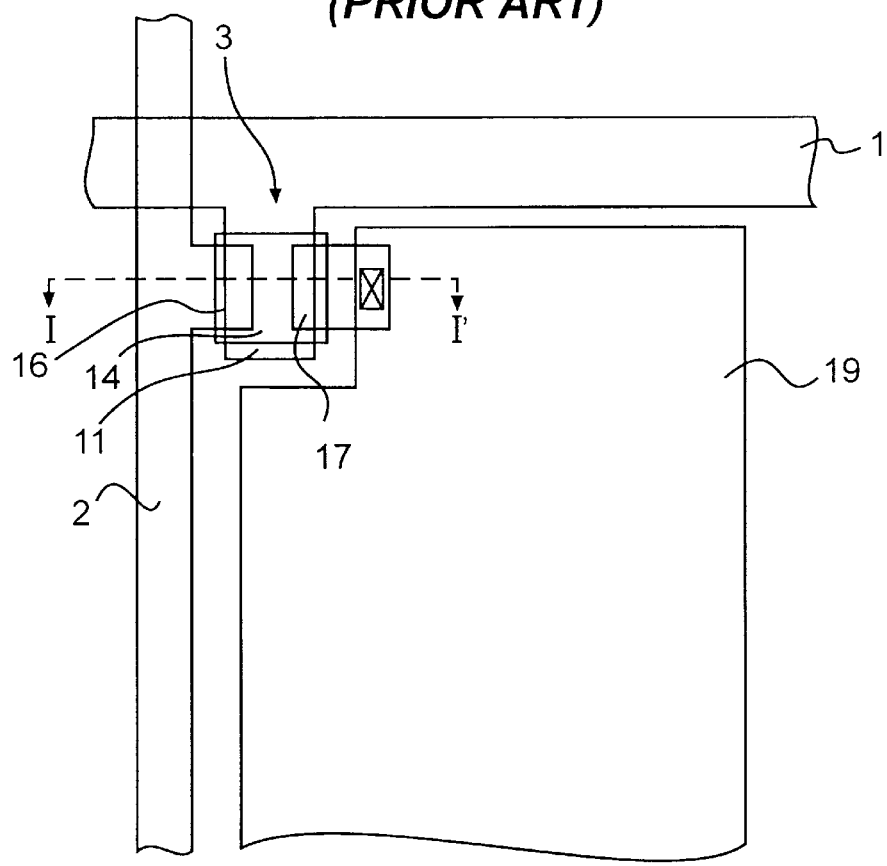
FIG. 1A is a plan view of a first example of the conventional AMLCD.
Figure 1B:
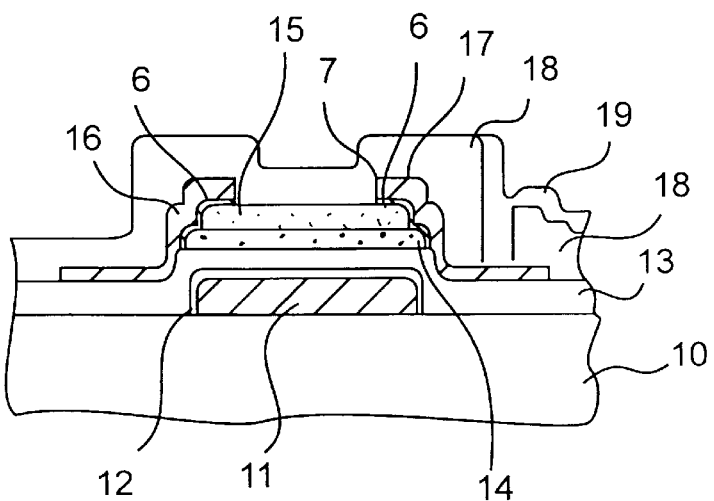
FIG. 1B is a cross-sectional view taken along the line I—I of FIG. 1A.
Figure 2A:
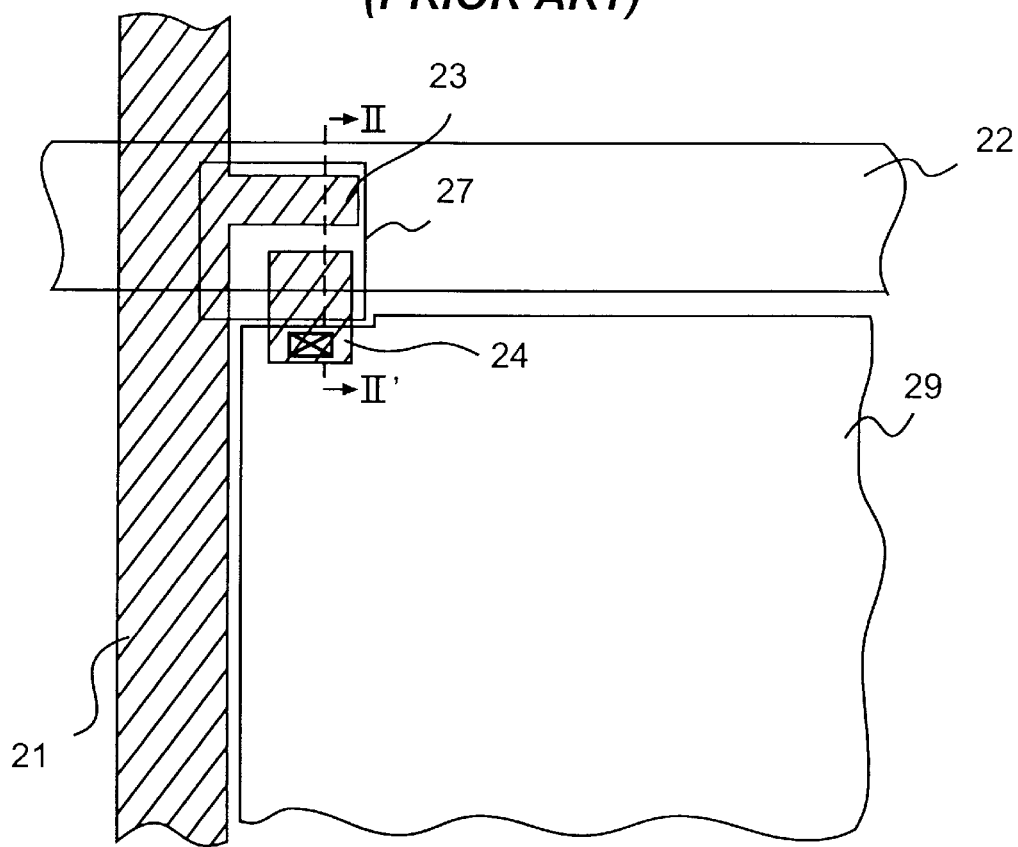
FIG. 2A is a plane view of a second example of the conventional AMLCD.
Figure 2B:
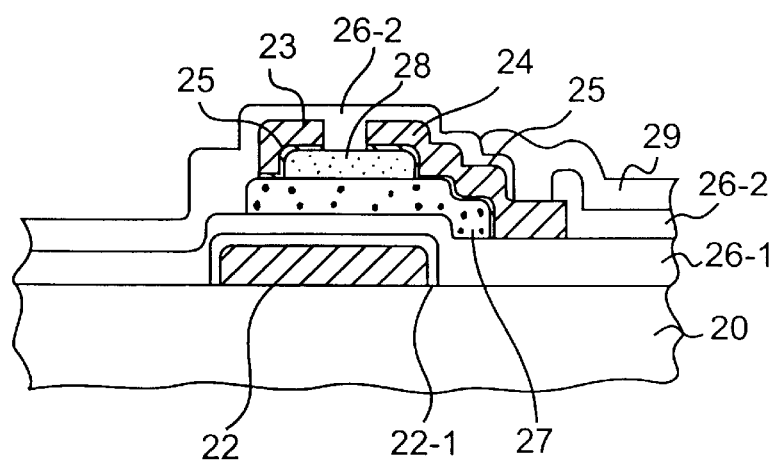
FIG. 2B is a cross-sectional view taken along the line II—II of FIG. 2A.
Figure 3A:
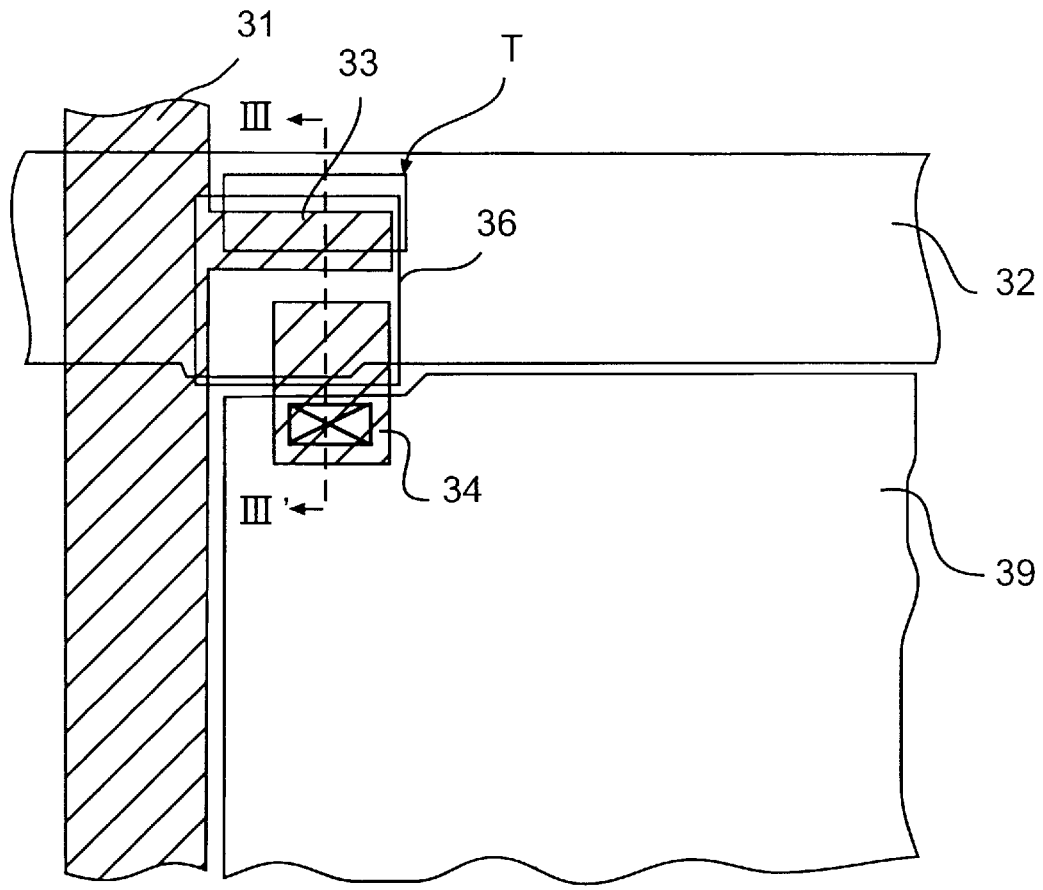
FIG. 3A is a plan view of an embodiment of an AMLCD in accordance with the present invention.

FIG. 3A is a plan view of an embodiment of an AMLCD in accordance with the present invention, in which an etch stopper is formed. In accordance with the first embodiment, a contact hole, T, of appropriate size is formed within a gate line 32, which serves as a back exposure mask for forming an etch stopper.

Preferably, gate line 32 having contact hole T and a protruding portion is formed on an insulating substrate. The contact hole and semiconductor active layer 36 divides gate line 32 into a gate region and a non-gate region. Next, a data line 31 is formed across the gate line 32. Data line 31 has a protruding portion 33 which includes the source electrode. The protruding portion 33 includes an inner lateral portion of data line 31 and covers a portion of the contact hole T of gate line 32. In addition, the protruding portion 33 is positioned in the same direction as the gate line 32 and overlaps a portion of the gate line 32. Protruding portion 33, i.e., the source electrode, covers the exposed semiconductor active layer 36 through the contact hole of the etch stopper.

As shown in FIG. 3A, a drain electrode 34 is disposed symmetrically with protruding portion 33 and the source electrode, or inner lateral portion, of data line 31. Moreover, a pixel electrode 39 is connected to the drain electrode 34. Preferably, drain electrode 34 and the source electrode are composed of the same material.

In this embodiment, the present invention has protruding portion 33 which extends from data line 31 and partially overlaps gate line 32 adjacent protruding portion. However, to improve the aperture ratio the invention contemplates forming gate line 32 in a straight line rather then forming one with a protruding portion.

Figure 3B:
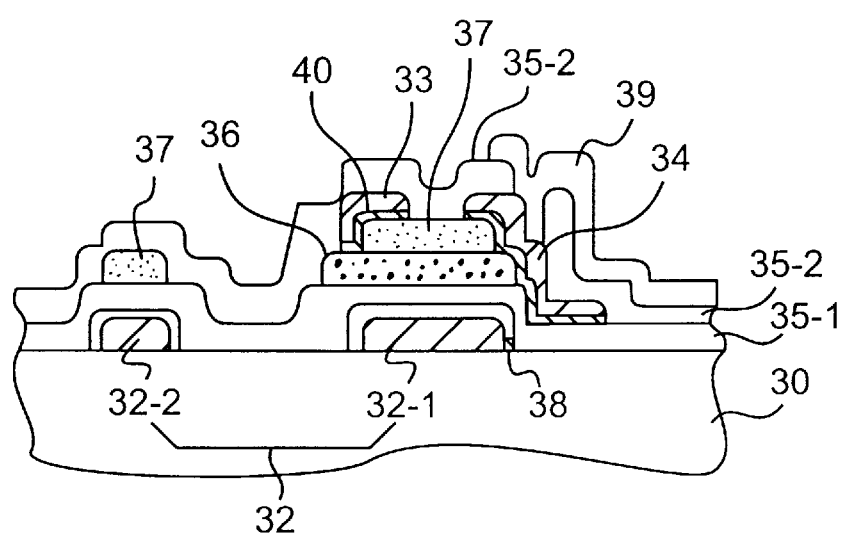
FIG. 3B is a cross-sectional view taken along the line III—III of FIG. 3A.

FIG. 3B is a sectional view taken along a line III—III of FIG. 3A. In this figure, the source electrode 33 and the drain electrode 34 are formed on an ohmic contact layer 40 which covers portions of an etch stopper 37 and a semiconductor active layer 36. In turn, semiconductor active layer 36 is on a first insulating layer 35-1 and overlaps a gate region 32-1 of the gate line 32. In this manner, the gate region 32-1, which is part of the gate line 32 under the source electrode 33, drain electrode 34, and the semiconductor active layer 36 form a TFT to perform a switching function.

As seen in FIG. 3A, a bent channel region is formed in the semiconductor active layer 36. The drain electrode 34 is connected through a contact hole in a second insulating layer 35-2 to the pixel electrode 39. Preferably, gate line 32 with gate electrode region 32-1 and non-gate electrode region 32-2 comprise a conductive material capable of anode-oxidation. This material choice allows an oxide insulating layer 38 to be formed on a surface of gate line 32.

FIGS. 4A–4E show steps of a method of fabricating an AMLCD consistent with this embodiment of the present invention. In addition, FIGS. 4A–4E are progressive sectional views taken along the line III—III of FIG. 3A.

First, as shown in FIG. 3A, a first conductive material layer is sputtered onto a transparent and insulating substrate 30. The first conductive material is then patterned to form a gate line 32 in which a contact hole T is made. Contact hole T divides the portion of the gate line into two regions 32-1 and 32-2. One region 32-1 will become a gate electrode region and the other region 32-2 will become a non-gate electrode region in the completed device. Preferably, the first conductive material is selected from the group including aluminum (Al), aluminum alloy, molybdenum (Mo), molybdenum alloy, or any other anode-oxidizable metal.

After forming the two regions, an anode oxidation process is carried out on the surface of the gate line 32 to form an anode oxidation layer 38. Next, as shown in FIG. 4B, a first insulating layer 35-1 and an amorphous silicon layer 36a are successively formed. In the preferred embodiment, a first insulating layer 35-1 is formed by providing a silicon oxide layer or a silicon nitride layer on the exposed surfaces of the oxide insulating layer.

Then, the amorphous silicon layer 36a is patterned with an etching process to form semiconductor active layer 36. This layer overlaps only the upper portions gate electrode region 32-1 and a portion of contact hole T of the gate line 32.

Figure 4A:
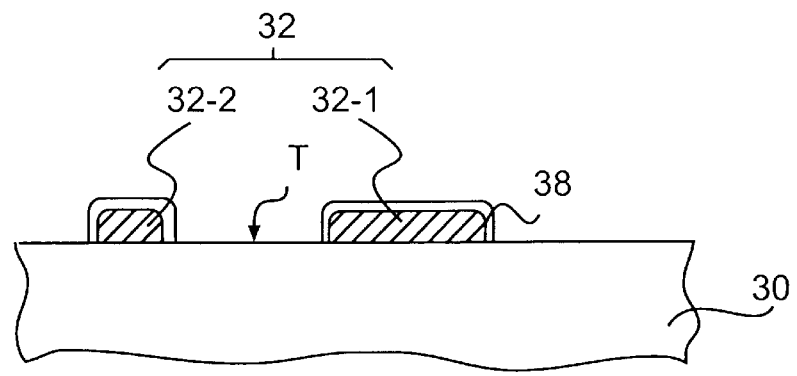
FIGS. 4A–4E are cross-sectional views taken along the line III—III of FIG. 3A and illustrating a manufacturing process in accordance with the present invention.
Figure 4B:
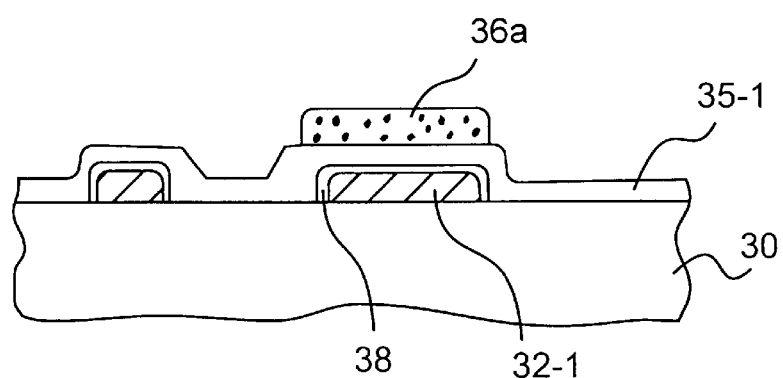
Figure 4C:
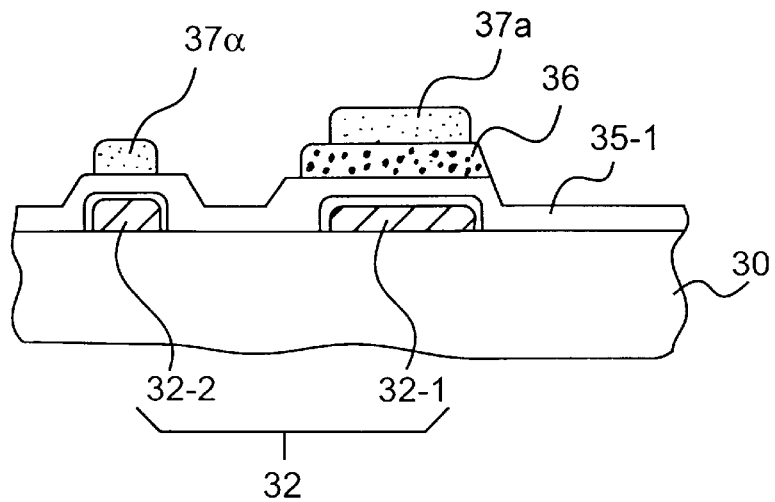

Referring to FIG. 4C, an insulating layer 37a for etch stopper, such as silicon nitride, is formed on the semiconductor active layer 36 and on the exposed portion of the first insulating layer 35-1. Next, a back exposure step is performed to create an etch stopper 37 on the semiconductor active layer 36 and on the exposed portion of the gate insulating layer 35-1. As a result, the etch stopper 37 has a contact hole at the same position as gate line 32.

Accordingly, etch stopper 37 exposes the portion of semiconductor layer 36 overlapping the contact hole in gate line 32.

In this embodiment, the etch stopper is formed with a known back exposure method. In this method, the insulating layer and a positive photosensitive photoresist film are successively formed on the semiconductor active layer 36 and the exposed first insulating layer 35-1. As a result, a photoresist pattern having the same shape as gate line 32 can be formed because the back exposure is performed using an opaque region, gate line 32, as a mask. In turn, using the photoresist pattern to form the etch stopper produces an etch stopper with the same shape as gate line 32. Accordingly, in this embodiment, the present invention allows the etch stopper 37 to be formed without using a pattern mask.

Figure 4D:
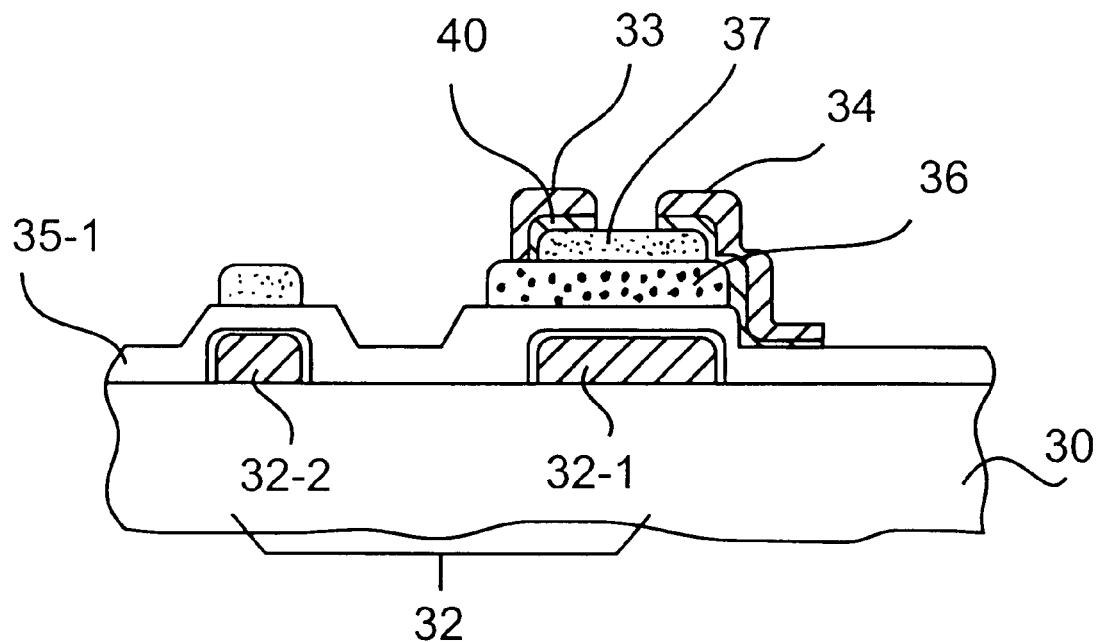

Next, as shown in FIG. 4D, a doped amorphous silicon layer 40 and a second conductive material layer 33, 34 are successively formed on the etch stopper 37, the exposed semiconductor active layer 36, and the exposed first insulating layer 35-1. Then, second conductive material layer and doped amorphous silicon layer are patterned to form a data line having a source electrode 33 and a drain electrode 34. Here, the patterned doped amorphous silicon layer becomes ohmic contact layer 40 and serves to reduce the contact resistance with semiconductor active layer 36.

After this step, the source electrode 33 is provided in an area as defined by the protruding portion of data line 31. Preferably, the protruding portions of data line 31 are angled or L-shaped such that an angled channel area can be obtained (as shown in FIG. 3A).

Figure 4E:
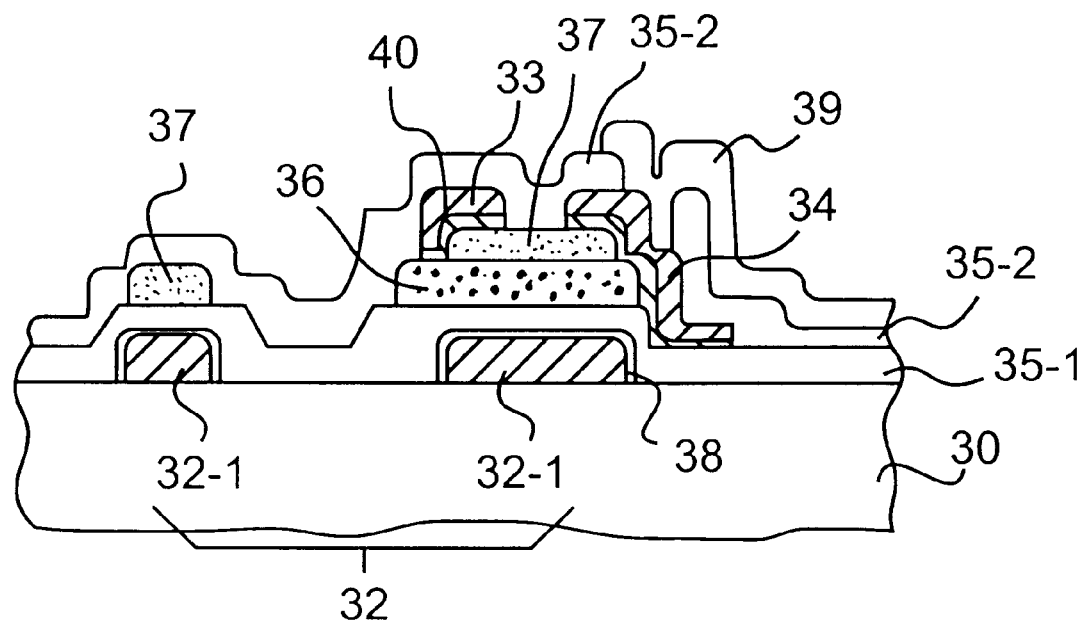

Referring to FIG. 4E, second insulating layer 35-2, preferably including silicon oxide and silicon nitride layers, is formed on the remaining exposed surfaces by sputtering or a chemical vapor deposition (CVD) method. Next, contact holes are formed by dry-etching the second insulating layer 35-2, thereby exposing a portion of drain electrode 34. Finally, a transparent conductive material, preferably, indium tin oxide (ITO), is deposited, and subsequently patterned to form a pixel electrode 39 which contacts the drain electrode 34 through the contact hole.

In another embodiment, the present invention not only has the advantage of creating the etch stopper by back exposure without any additional mask patterns, but also has the advantage of a high aperture ratio, as compared with the conventional AMLCD.

Figure 5A:
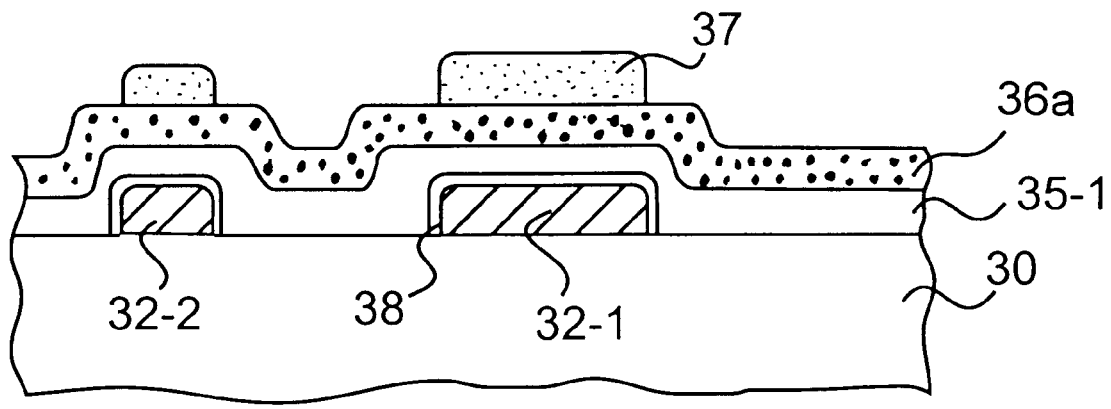
FIGS. 5A–5B are cross-sectional views taken along the line III—III of FIG. 3A and illustrating another manufacturing process in accordance with the present invention.
Figure 5B:
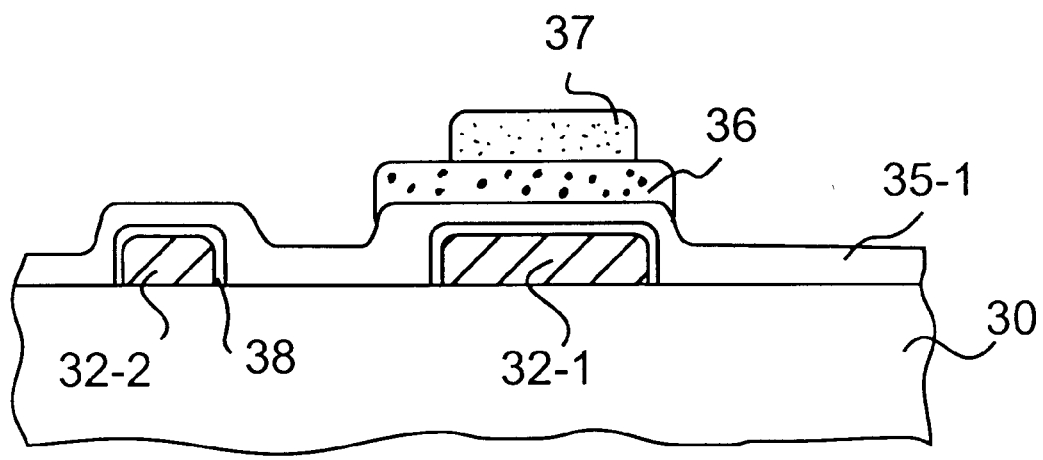

FIGS. 5A–5B show steps of a method of fabricating an AMLCD in accordance with a second embodiment of the present invention taken along the line III—III of FIG. 3A.

The etch stopper, which is produced as shown in FIGS. 4A–4E, is formed with the same shape as the gate line. But, the etch stopper can be formed only on a semiconductor active layer because the etch stopper's function is to prevent the etchant from over etching the semiconductor active layer which is formed of amorphous silicon.

First, as shown in FIG. 4A and described above, the gate line having gate electrode region 32-1, non gate electrode region 32-2 and a contact hole, and the anode oxide layer 38 are formed on the insulating and transparent substrate 30.

Next, as shown in FIG. 5A, a first insulating layer 35-1, an amorphous silicon 36a and an insulating layer for an etch stopper, such as silicon nitride layer, are successively formed. Then, using a back exposure method, the insulating layer is etched to form an etch stopper 37.

In this embodiment, the etch stopper is formed with a back exposure method. In this method, the insulating layer used for the etch stopper and a positive photosensitive photoresist film are successively formed on the semiconductor active layer 36 and the exposed first insulating layer 35-1. As a result, a photoresist pattern having the same shape as gate line 32 can be formed because the back exposure is performed using an opaque region, gate line 32, as a mask. In turn, using the photoresist pattern to form the etch stopper produces an etch stopper with the same shape as gate line 32. Accordingly, in this embodiment, the present invention allows the etch stopper to be formed without using a pattern mask.

Next, as shown in FIG. 5B, the etch stopper with the same shape as gate line 32 is etched to form an etch stopper with the same shape as only the gate electrode region 32-1 of the gate line 32. This etch stopper 37 is produced with the mask having the pattern of the gate electrode region of gate line 32. Amorphous silicon layer 36a is patterned to form a semiconductor active layer 36. This region is defined as shown in FIG. 3A.

Finally, as described by the general processes outlined in FIGS. 4D–4E, ohmic contact layer, data line having source electrode, drain electrode, second insulating layer, and pixel electrode are successively formed.

As described above, in the AMLCD of the present invention, the aperture ratio increases by forming a TFT above the gate line and providing a nonlinear channel area. In contrast to conventional fabrication techniques, the channel region is formed in a non-straight line and therefore, the length of the channel is extended. Consequently, as compared with a TFT having the same channel length, the parasitic capacitance generated between the gate line and the drain electrode can be reduced significantly.

Further, in the case where a contact hole is formed within the gate line, an etch stopper can be formed by using the previously formed gate line as a mask, without first preparing a pattern mask. This advantage greatly improves and simplifies the fabrication process.

Additional advantages and modifications will readily occur to those skilled in the art. Therefore, the invention in its broader aspects is not limited to the specific details and illustrated examples shown and described herein. Accordingly, various modifications may be made without departing from the spirit or scope of the general inventive concept as defined by the appended claims and their equivalents.

What is claimed is:

1. An active matrix liquid crystal display (AMLCD) comprising:
   an insulating substrate;
   a gate line extending in a first direction on said substrate and having a first region corresponding to a gate electrode region, a second region corresponding to a non-gate electrode region, and a contact hole adjacent to said first region and said second region, said gate line exposing a portion of said substrate;
   a first insulating layer on said gate line;
   an island-shaped semiconductor active layer above and overlapping said first region and a portion of said contact hole of said gate line;
   an etch stopper on semiconductor active layer and exposing a portion of said semiconductor active layer;
   a data line on said substrate crossing said gate line and having a first protruding portion extending in said first direction above said first region of said gate line and connecting said exposed portion of said semiconductor active layer as a source electrode, and a second portion contiguous with said protruding portion, said first and second portions of said data line overlying said gate line; and
   a drain electrode disposed in correspondence with said source electrode.

2. The AMLCD according to claim 1, wherein said first portion of said data line is defined as a source electrode including an inner portion spaced laterally from said data line.

3. The AMLCD according to claim 1, wherein said etch stopper has the same shape as said gate line.

4. The AMLCD according to claim 1, wherein said etch stopper has the same shape as said first region of said gate line.

5. The AMLCD according to claim 1, wherein said gate line is linear and has a substantially uniform width.

6. The AMLCD according to claim 1, wherein said gate line has a protruding portion partially overlapping said drain electrode and one side of said source electrode.

7. The AMLCD according to claim 1, wherein said source electrode and said drain electrode define an angled channel region of a thin film transistor (TFT).

8. The AMLCD according to claim 1, wherein said etch stopper has the same shape as said gate line.

9. The AMLCD according to claim 1, wherein said etch stopper has the same shape as said first region of said gate line.

10. An active matrix liquid crystal display (AMLCD) comprising:
    an insulating substrate;
    a gate line extending in a first direction on said substrate and having a first region corresponding to a gate electrode region, a second region corresponding to a non-gate electrode region, and a contact hole adjacent to said first region and said second region, said gate line exposing a portion of said substrate;
    a first insulating layer on said gate line;
    an island-shaped semiconductor active layer above and overlapping said first region and a portion of said contact hole of said gate line;
    a data line on said substrate crossing said gate line and having a first protruding portion extending in said first direction above said first region of said gate line and connecting said exposed portion of said semiconductor active layer as a source electrode of a thin film transistor (TFT), and a second portion contiguous with said protruding portion, said first and second portions of said data line overlying said gate line; and
    a drain electrode disposed in correspondence with said source electrode, said contact hole of said gate line providing that the R/C-type delay of said gate line and the turn-on time of said TFT are reduced.

11. The AMLCD according to claim 10, wherein said first portion of said data line is defined as a source electrode including an inner portion spaced laterally from said data line.

12. The AMLCD according to claim 10, wherein said gate line is linear and has a substantially uniform width.

13. The AMLCD according to claim 10, wherein said gate line has a protruding portion partially overlapping said drain electrode and one side of said source electrode.

14. The AMLCD according to claim 10, wherein said source electrode and said drain electrode define an angled channel region of said TFT.

15. An active matrix liquid crystal display (AMLCD) comprising:

an insulating substrate;

a gate line extending in a first direction on said substrate and having a first region corresponding to a gate electrode region, a second region corresponding to a non-gate electrode region, and a contact hole adjacent to said first region and said second region, said gate line exposing a portion of said substrate;

a first insulating layer on said gate line;

an island-shaped semiconductor active layer above and overlapping said first region and a portion of said contact hole of said gate line;

an etch stopper on semiconductor active layer and exposing a portion of said semiconductor active layer;

a data line on said substrate crossing said gate line and having a first protruding portion extending in said first direction above said first region of said gate line and connecting said exposed portion of said semiconductor active layer as a source electrode of a thin film transistor (TFT), and a second portion contiguous with said protruding portion, said first and second portions of said data line overlying said gate line; and a drain electrode disposed in correspondence with said source electrode, said contact hole of said gate line providing that the R/C-type delay of said gate line and the turn-on time of said TFT are reduced.

* * * * *